A. S. JOHNSON.

GARTER CLASP.

APPLICATION FILED JUNE 15, 1921.

Reissued July 26, 1921. 15,164.

George L. Lyngloff

Thomas E. Turpin

WITNESSES.

Augusta S. Johnson.

INVENTOR

BY Victor J. Evans

ATTORNEY

UNITED STATES PATENT OFFICE.

AUGUSTA S. JOHNSON, OF PHILADELPHIA, PENNSYLVANIA.

GARTER-CLASP.

15,164. Specification of Reissued Letters Patent. Reissued July 26, 1921.

Original No. 1,368,558, dated February 15, 1921, Serial No. 364,004, filed March 8, 1920. Application for reissue filed June 15, 1921. Serial No. 477,804.

*To all whom it may concern:*

Be it known that I, AUGUSTA S. JOHNSON, a subject of the King of Sweden, residing at Philadelphia, in the county of Philadelphia and State of Pennsylvania, have invented new and useful Improvements in Garter-Clasps, of which the following is a specification.

The invention relates to apparel and more particularly to garment supporting devices therefor and has for an object to provide a clasp for garment supporters for readily attaching and securing the supporting device to the garment or apparel and for as easily removing the supporter from connection with the garment, providing also an efficient clasp or connection which will not tend to tear or break the fabric of the apparel and which, made of few and simple parts, can be cheaply manufactured.

Among other features I aim to provide a clasp, particularly adapted for use with hose supporting devices, commonly known as garters, and by the use of which the hose or stocking will be effectively supported in position without danger of the clasp becoming accidentally unfastened and the usual tendency of the hose to "run" or tear at its point of connection with the clasp, will be prevented, due to the novel form of construction and arrangement of the parts of the clasp whereby that portion of the stocking gripped by the clasp will be held by parts which are devoid of sharp or serrated edges, further being cushioned by an underlying soft material interposed between the button part of the clasp and the material of the stocking.

To this end the button part is inclosed in a sack made of a material which will readily conform to the contour of the button part thus providing a cushion for the seating of that portion of the stocking which is to be gripped, the gripping and holding part of the clasp serving to grip and clamp the material of the stocking around and over the covered button part, preventing contact and frictional wear of the stocking material with metallic, rubber or other rough surfaces of the button as in the use of many forms of stocking clasps, now generally employed in the supporting of stockings or other delicate fabrics.

In the further disclosure of the invention reference is to be had to the accompanying drawings constituting a part of this specification, in which similar characters of reference denote corresponding parts in all of the views, and in which:—

Figure 1:
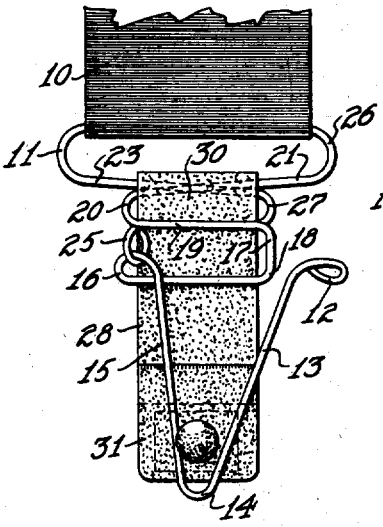
Figure 1 is a fragmentary front elevation of a hose supporter showing my form of garment clasp, the same being in open position.

Referring more particularly to Figs. 1–4 inclusive, the numeral 10 indicates a webbing which may be of any desired cloth or material and which may have its lower end secured to or looped around the upper portion of a clasp, which latter in its entirety is indicated by the numeral 11. The clasp consists substantially of a single piece of wire which is of a somewhat spring-like nature, one end of the wire being bent upon itself in the nature of an eye to form a handle 12, the wire then providing a straight portion 13, after which the wire is bent as at 14 and then provides another straight portion 15 similar to the straight portion 13, the parts mentioned, primarily forming that portion of the clasp which might be termed the gripping member. The end of the straight portion 15 is now looped as indicated at 16 and is passed transversely beneath the straight portion 15 and also bent upwardly as at 17, so as to form a catch at the point 18 for the handle part 12, the wire being then bent crosswise as at 19 and then bent upon itself as at 20 to form a straight portion inclined somewhat as at 21 after which the wire is again bent upon itself to form a straight portion 22, the wire being then bent downwardly to form another inclined portion 23 and bent upon itself to form a straight portion 24 underlying the cross-wise straight portion 19 after which the wire is bent to form the eye 25 which engages with the loop or eye portion 16. It will now be seen that with this formation of the wire there is formed a main loop 26 to which the webbing 10 is connected and that the two inclined portions 21, 23 aid in forming this loop with the straight portion 22, these same inclined portions together with the cross straight portions 19, 24, forming another loop 27 of a supplementary nature with these same cross portions 19, 24, the eyes 16, 25, and the part 18 providing the catch.

A button supporter 28 is provided, consisting of a strip 29 of some suitable cloth, which strip is looped around the lower part of the loop 26, one of the pieces 30 of the strip passing immediately beneath and through the supplemental loop 27 and with the other piece 31 extending downwardly to lie beneath the gripping member formed by the lower part of the wire bent as mentioned heretofore. The lower portion of the strip forming the button supporting member is suitably fashioned to provide a pocket or sheath 31 in which is loosely arranged a button 32, and I preferably have this sheath formed of a soft material such as chamois. By employing a chamois as the material from which to make the sheath, I provide for a cushion around the button so that when the button is engaged with the gripping member, the apparel will be held against the cushion and not come in direct contact with the material of the button.

Figure 2:
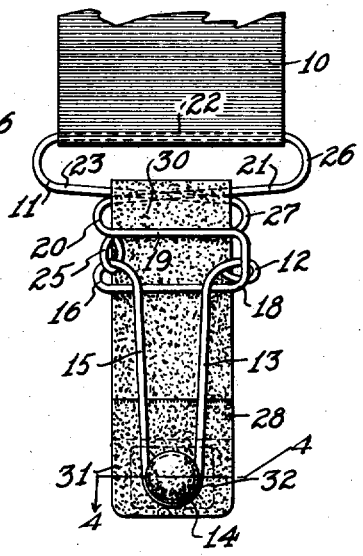
Fig. 2 is a similar view with the clasp shown in closed position.
Figure 3:
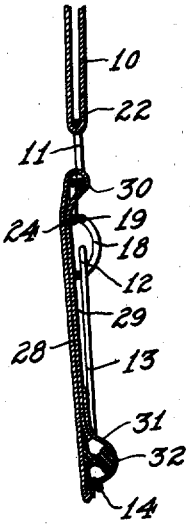
Fig. 3 is a vertical sectional view of the structure shown in Fig. 2.
Figure 4:
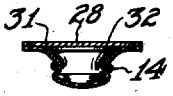
Fig. 4 is a horizontal sectional view taken substantially on the line 4—4 in Fig. 2.

In the use of the device described, assuming that the gripping member is open as in Fig. 1, a portion of the stocking or other apparel is arranged over the button supporting member and overlying the inclosed button and the button and this disposed part of the apparel, are then slid into engagement with the gripping member by arranging the same between the straight portions 13, 15, thereof, sliding the same down to the apex or bent portion 14 of the member, after which the free end of the gripping member, namely the handle portion 12 is engaged with the catch 18 as shown in Fig. 2, and thus the straight side or portion 13, being drawn toward the straight portion 15, the space normally therebetween will be lessened to the diameter of the head of the button so a width which will be substantially less than that the button cannot be disengaged from the griping member when the latter is in closed position.

I particularly desire to point out that the button inclosed in the sheath is not sewed or secured within the sheath but is arranged loosely therein so that in confining the button within the gripping member and by the latter, the same portion of material of the covering part, may not always be engaged by the gripping member as would be the case if the button were secured in the sheath, thus preventing the material or chamois overlying the button, from wearing out at one point and with this arrangement of having the button loose in the sheath, I find that a better engagement and gripping action of the gripping member and the stocking or apparel can be obtained. It should be also noted that the wire-like construction of the gripping member provides one which has no sharp edges and the button being covered by the soft chamois, the apparel when gripped between the button and the gripping member will not tend to tear or be broken away when subjected to a pull or strain, the elongated formation of the gripping member allowing for a longitudinal movement of the button and its accompanying apparel without danger of the button becoming disengaged from the gripping member.

Figure 5:
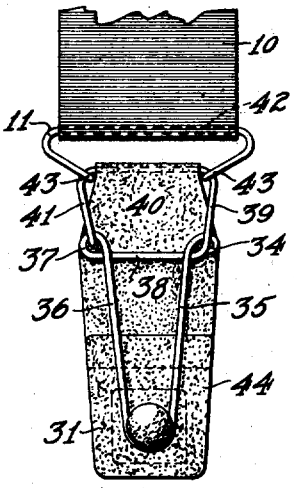
Fig. 5 is a front elevation of a slightly modified form of clasp member.
Figure 6:
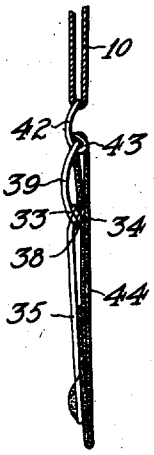
Fig. 6 is a side elevation of the same.

In the structure shown in Figs. 5 and 6, the gripping member indicated by the numeral 33 is formed by having the wire provided with a handle 34 and the straight portions 35, 36, substantially the same as in the preferred construction with the wire after the last straight portion has been formed, bent to form an eye 37 and a cross piece or part 38, after which the wire is bent upwardly as at 39 and then across as at 40 and then down and provided with a hook 41, which is hooked into the eye 37. The loop 42 for the attachment of the webbing 10 in this instance, is formed from a separate piece of material which has its end bent to hook and engage around the upper portion of the wire forming the gripping member as at 43 and the button supporting member 44, is carried upon a cross portion of the wire which is employed to form the gripping member, whereas the webbing is carried by the other piece of wire described.

Figure 7:
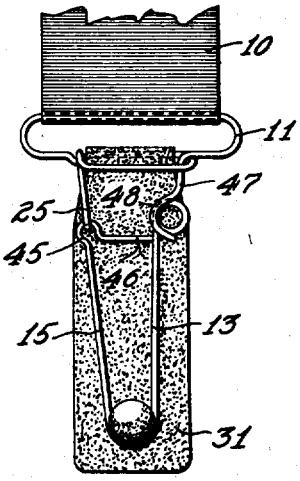
Fig. 7 is a front elevation of still another slightly modified form of my device.

In the modified form shown in Fig. 7, I provide a construction somewhat similar to that shown in Figs. 1, 2 except that instead of forming an eye 16 for the connection of the eye 25 therewith, I pass a portion of the material of the wire forming the gripping member, through the eye 25, forming a loop 45 with the sides of the loop bent toward each other around the eye, and in this connection the cross portion 46 formed after the loop has been made, is bent to form an upwardly projecting part 47 constituting a catch 48 for the engagement of the free end of the gripping member therewith.

With the construction set forth, I provide an apparel support and particularly a stocking clasp which because of the few parts, can be cheaply manufactured and in which the button supporting part is at no time directly in contact with the material of the stocking, the latter engaging and resting upon that portion of the sheath for the button, which overlies the button, thus forming a cushion between the material of the stocking and the button itself and therefore providing for a more effective gripping between the stocking and the gripping member which partially surrounds the upstanding part of the button.

Having described my invention, I claim:—

1. A garment supporter comprising a frame formed from a single length of wire and bent between its ends to provide a horizontally disposed loop, the terminals of said loop being crossed and extended to provide a second relatively small loop arranged beneath the first mentioned loop, a webbing attached to the first mentioned loop, a button supporting member associated with said webbing, and a gripping member suspended from the second mentioned loop to engage said button.

2. A garment supporter comprising a frame formed from a single length of wire and bent to provide a horizontally disposed loop, the terminals of said loop being crossed and extended to provide a second relatively small loop, a webbing attached to the first mentioned loop, a button supporting member associated with said webbing, a gripping member formed by said wire and depending from the second mentioned loop to engage said button, and said gripping member including a relatively movable limb having its free end engaged to said second loop for the purpose specified.

3. A garment supporter comprising a frame formed from a single length of wire to provide a horizontally disposed loop the terminals of said loop being crossed and extended to provide a second relatively small loop arranged beneath the first mentioned loop, a webbing attached to the first mentioned loop, a button supporting member associated with said webbing, a third loop arranged beneath the second mentioned loop, a gripping member including a relatively movable limb adapted to engage said button, and the free terminal of said limb being designed to engage the third mentioned loop as described.

4. A garment supporter comprising a frame formed from a single length of wire bent to provide a horizontally disposed loop, a second relatively small loop arranged beneath the first mentioned loop, a webbing supported by the first mentioned loop, a button supporting member carried by the webbing, one terminal of the second mentioned loop being formed to provide an eye, the other terminal of said loop being passed through the eye and extended to provide a gripping member including a relatively movable limb adapted to engage said button, and the free terminal of said limb being designed to engage said second mentioned loop as described.

5. In a garment supporter the combination with a clasp, of a button supporting member comprising a strip connected to the clasp and depending therefrom, a sheath at the lower portion of the strip and formed of the material thereof and a button disposed in said sheath but not rigidly connected thereto, said button being freely movable within the sheath.

In testimony whereof, I affix my signature, this 25th day of April, 1921.

AUGUSTA S. JOHNSON.